United States Patent Office 3,525,678
Patented Aug. 25, 1970

3,525,678
METHOD OF PREPARING DIALKYL ESTERS OF PERFLUORODICARBOXYLIC ACIDS
Yung Ki Kim and Ogden R. Pierce, Midland, Mich., assignors to Dow Corning Corporation, Midland, Mich., a corporation of Michigan
No Drawing. Filed Oct. 24, 1966, Ser. No. 588,704
Int. Cl. B01j 1/10; C07c 69/62
U.S. Cl. 204—158
3 Claims

ABSTRACT OF THE DISCLOSURE

This invention concerns the preparation of dialkyl esters of perfluorodicarboxylic acids, by reacting omega-bromo monoalkyl esters of perfluorocarboxylic acids with metals. Preferably the reaction is carried out under the influence of electromagnetic radiation having a wave length of less than 4000 A.

In accordance with this invention an ester of the formula $BrR_fCOOR'$ is reacted with a metal of the group consisting of group II-B metals, Mg, Cu, Ag, Fe, Co, Ni, Sn and Pb with sufficient heating to produce esters of the formula $R'OOC(R_f)_2COOR'$ in which $R_f$ is a perfluoroalkylene radical of at least one carbon atom and $R'$ is an alkyl radical of from 1 to 6 carbon atoms.

The temperature at which the above reaction is carried out is not critical and many range from 0° C. up to the decomposition point of the product (i.e. from 0 to 300° C. or above). The precise temperature necessary to obtain optimum results varies with the starting ester and with the particular metal employed. Also the reaction temperature will vary, depending upon the amount and type of electromagnetic radiation employed, if any.

It is desirable to carry out this reaction by subjecting the reaction mixture to electromagnetic radiation having a wave length of less than 4000 A. This includes radiation such as ultraviolet light, X-rays and gamma-rays. It has been found that the use of such radiation reduces the temperature needed for the reaction and reduces the amount of undesired by-products and thereby increases the yields of the desired diesters.

The process of this invention is an excellent way of preparing diesters of the type shown above. Prior to this invention, the only way of preparing such esters was by the use of the electrolytic cell, wherein a fatty acid was fluorinated with hydrogen fluoride. This is a drastic reaction and often results in chain scission producing a multitude of products. In fact, perfluoroesters having branched configurations cannot be prepared by the electrochemical method due to the scission of the pendant groups. Consequently, the process of this invention offers for the first time a commercially feasible manner of preparing branched esters of the type

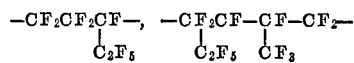

The products prepared by the process of this invention are useful as intermediates for the preparation of perfluorotriazine polymers and for the preparation of perfluoropolyesters. The latter materials can be prepared by reacting the diesters of this invention with diols to produce polyesters and to split out R'OH.

For the purpose of this invention $R_f$ can be any perfluoroalkylene radical such as —$CF_2$—, —$(CF_2)_8$—, —$(CF_2)_{40}$—

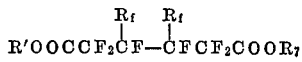

and

Particularly desirable are those in which $R_f$ has from 2 to 6 inclusive carbon atoms. Also for the purpose of this invention R' can be any lower alkyl radical such as methyl, ethyl, isopropyl, t-butyl, or hexyl.

The following examples are illustrative only and should not be construed as limiting the invention, which is properly delineated in the appended claims.

EXAMPLE 1

A quartz flask was immersed in a water bath which was arranged to circulate cold water. A General Electric model UA–2 ultraviolet lamp was placed in a quartz well and immersed in the water bath about 4 inches from the flask. 50 g. of $BrCF_2CF_2COOC_2H_5$ and 265 g. of mercury were placed in the flask. The mixture was stirred and irradiated with ultraviolet light under an atmosphere of dry nitrogen at about 20° C. for 64 hours. The mixture was then dissolved in methylenechloride and the excess mercury and mercury salt were filtered off. The methylenechloride was evaporated and a distillation of the crude residue produced $C_2H_5OOC(CF_2)_4COOC_2H_5$, boiling 57° C. at 0.5 mm.

EXAMPLE 2

Employing the apparatus of Example 1, a mixture of 38 g. of $Br(CF_2)_4COOC_2H_5$ and 100 g. of mercury was irradiated with ultraviolet light at about 15° C. for 55 hours under an atmosphere of dry nitrogen. The reaction mixture was dissolved in diethyl ether and the mercury and mercury salts were removed. The solvent was removed and the product distilled to give $$C_2H_5OOC(CF_2)_8COOC_2H_5$$

boiling at 103 to 110° C. at 0.4 to 0.5 mm.

EXAMPLE 3

Using the apparatus described in Example 1, a mixture of 140 g. of

and 693 g. of mercury was irradiated at 25° C. for 96 hours under an atmosphere of dry nitrogen. The reaction mixture was taken up in methylene chloride and after removal of unreacted mercury and mercury salt, the methylenechloride was removed and the product distilled to give

boiling at 102 to 103° C. at 3 mm. and having a refractive index at 26° C. of 1.3570.

EXAMPLE 4

When the following organic bromoesters are substituted in the reaction of Example 1, the following diesters are obtained:

Bromoesters: Diesters
$BrCF_2COOCH_3$ ———— $CH_3OOCCF_2CF_2COOCH_3$
$Br(CF_2)_{20}COOC_6H_{13}$
　　　　　　　$C_6H_{13}OOC(CF_2)_{40}COOC_6H_{13}$
$Br(CF_2)_4COOCH(CH_3)_2$
　　　　　　　$(CH_3)_2CHOOC(CF_2)_8COOCH(CH_3)_2$

EXAMPLE 5

When an equimolar mixture of $Br(CF_2)_2COOCH_3$ and $Br(CF_2)_2COOC_2H_5$ is employed in the process of Example 1, a mixture of the following products is obtained:

$$CH_3OOC(CF_2)_4COOCH_3$$
$$CH_3OOC(CF_2)_4COOC_2H_5$$
and
$$C_2H_5OOC(CF_2)_4COOC_2H_5$$

This mixture can be separated into its pure components by gas liquid chromatography or by distilaltion.

EXAMPLE 6

When the bromester $Br(CF_2)_2COOC_2H_5$ is heated in the presence of iron at a temperature above 150° C., the product $C_2H_5OOC(CF_2)_4COOC_2H_5$ is obtained.

EXAMPLE 7

Equivalent results are obtained when the following metals are substituted in the process of Example 1, Zn, Cd, Mg, Cu, Ag, Co, Ni, Sn and Pb.

That which is claimed is:
1. The method comprising reacting a compound of the formula $BrR_fCOOR'$ with a metal selected from the group consisting of Group II–BB metals, Mg, Cu, Ag, Fe, Co, Ni, Sn and Pb, at a temperature and time sufficient to produce a product of the formula $R'OOC(R_f)_2COOR'$ in which $R_f$ is a perfluoroalkylene radical of at least one carbon atom and R' is an alkyl radical of from 1 to 6 inclusive carbon atoms, said reaction being carried out under the influence of electromagnetic radiation having a wavelength of less than 4000 A.

2. The method of claim 1 wherein said metal is mercury.

3. The method of claim 1 wherein $R_f$ is a perfluoroalkylene radical having from 2 to 6 inclusive carbon atoms.

References Cited

McBee: Indust. and Eng. Chem., vol. 39 (1947), pp. 236, 237.

Barlow et al.: J. Chem. Soc., (1955), pp. 1749, 1750, 1752.

Theilheimer I: Syn. Methods of Organic Chem., vol. 1, p. 200 (1948).

Theilheimer II: Syn. Methods of Org. Chem., vol. 4, p. 280 (1950).

LORRAINE A. WEINBERGER, Primary Examiner

E. JANE SKELLY, Assistant Examiner

U.S. Cl. X.R.

260—75, 485